(12) United States Patent
Kohtani et al.

(10) Patent No.: US 6,236,464 B1
(45) Date of Patent: *May 22, 2001

(54) IMAGE FORMING SYSTEM AND CONTROL METHOD THEREFOR

(75) Inventors: Hideto Kohtani, Hachioji; Toshiyuki Kitamura, Osaka; Kenichi Takahashi, Kawasaki, all of (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/922,643

(22) Filed: Sep. 3, 1997

(30) Foreign Application Priority Data

Sep. 12, 1996 (JP) .................................................. 8-241790
Aug. 27, 1997 (JP) .................................................. 9-231133

(51) Int. Cl.[7] ......................... G06F 15/173; G06F 15/163
(52) U.S. Cl. ........................................ 358/1.15; 358/1.16
(58) Field of Search ................................... 395/610, 200, 395/650, 611, 109; 358/296, 401, 202, 204, 443, 442, 408, 1.15, 1.14, 1.16

(56) References Cited

U.S. PATENT DOCUMENTS

| 5,226,112 | * | 7/1993 | Mensing et al. | 395/114 |
| 5,361,134 | * | 11/1994 | Hu et al. | 358/296 |
| 5,526,469 | * | 6/1996 | Brindle et al. | 395/109 |
| 5,745,748 | * | 4/1998 | Ahmad et al. | 395/610 |

* cited by examiner

*Primary Examiner*—Cheuk Fan Lee
(74) *Attorney, Agent, or Firm*—Fitzpatrick, Cella, Harper & Scinto

(57) ABSTRACT

An image forming system which freely combines functions of a plurality of devices connected on a network in accordance with necessity, and a control system for the system. Each of the plurality of devices stores information indicating functions which can be provided by the device in advance. A functional unit which serves as a supervisor collects these stored information and analyzes a combination of functions to perform operation designated by a user, based on the collected information. Then the supervisor combines the functions based on the result of analysis and performs the desired processing operation by the combination of functions.

38 Claims, 7 Drawing Sheets

IMAGE FORMING SYSTEM AND CONTROL METHOD THEREFOR

BACKGROUND OF THE INVENTION

This invention relates to an image forming system which performs a designated function by a plurality of devices connected to a network and a control method for the image forming system.

In a conventional image forming system, functions for handling an original document, reading an image, transferring an image and the like are implemented in a single device. A user selects the device in correspondence with desired processing. For example, if the user has a color original document, the user may select a device having a color output function, or if the user has a double-sided original document, the user may select a device having a double-sided output function.

However, to utilize this system, the user must know the functions of the respective devices to a certain degree. In an environment where a plurality of devices having functions as described above are provided, the user is required to select a device in accordance with necessity for each processing, based on his/her knowledge about these functions. This is troublesome for the user.

In recent years, image forming devices which enable high-image quality output and which have multiple functions have been developed. In these devices, many functions are similar to each other (e.g., a document reader and some type of image processing module). Further, in recent years, there is a tendency to interconnect these devices via a network so as to constitute an image forming system.

However, if some of the devices constituting such system have similar function modules as described above, it is difficult for a user of the system to actually perform a desired function by freely combining these functions.

SUMMARY OF THE INVENTION

Accordingly, it is an object of the present invention to provide an image forming system which enables a user to perform a desired operation by freely combining functions of a plurality of devices on a network, without considering these functions.

According to one aspect of the present invention, the foregoing object is attained by providing an image forming system which has a plurality of functional units connected via a network and which performs image forming processing by using functions provided by the respective plurality of functional units, comprising: memory means for storing information indicating functions which can be provided by each of the functional units; transmission means for transmitting the information stored in the memory means to another functional unit; collection means for collecting the information indicating the functions transmitted by the transmission means from the plurality of functional units; analyzing means for analyzing appropriateness of a combination of the functions, so as to perform image forming processing operation designated by a user; and combining means for combining the functions collected by the collection means, in accordance with the result of analysis by the analyzing means.

According to another aspect of the present invention, the foregoing object is attained by providing a control method for an image forming system which has a plurality of functional units connected via a network and which performs image forming processing by using functions provided by the respective functional units, comprising: a collection step of collecting information indicating the functions which can be provided by each of the functional units at one functional unit which manages all the functional units, and storing the information into a predetermined storage medium; an analyzing step of analyzing appropriateness of a combination of the functions, so as to perform image forming processing operation designated by a user; and a combining step of combining the functions collected at the collection step, in accordance with the result of analysis at the analyzing step.

In accordance with the present invention as described above, a functional unit acting as a supervisor among the plurality of functional units, which manages all the plurality of functional units connected via a network, collects information indicative of functions which can be provided by each of the functional units via the network from the respective functional units, analyzes appropriateness of combining these functions to perform image forming processing operation designated by the user, and combines the necessary function units in accordance with the result of the analysis.

The present invention is particularly advantageous since the functions of the plurality of devices on the network can be collected, and in accordance with image forming processing operation designated by a user, devices having necessary functions can be automatically combined. This enables the user to perform desired image forming by the combination of functions in accordance with the necessity at each image forming, without considering the functions of the respective devices.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiment of the invention and, together with the description, serve to explain the principles of the invention.

DETAILED DESCRIPTION OF THE PREFERRED EMBODIMENT

Preferred embodiment of the present invention will now be described in detail in accordance with the accompanying drawings.

Figure 1A:
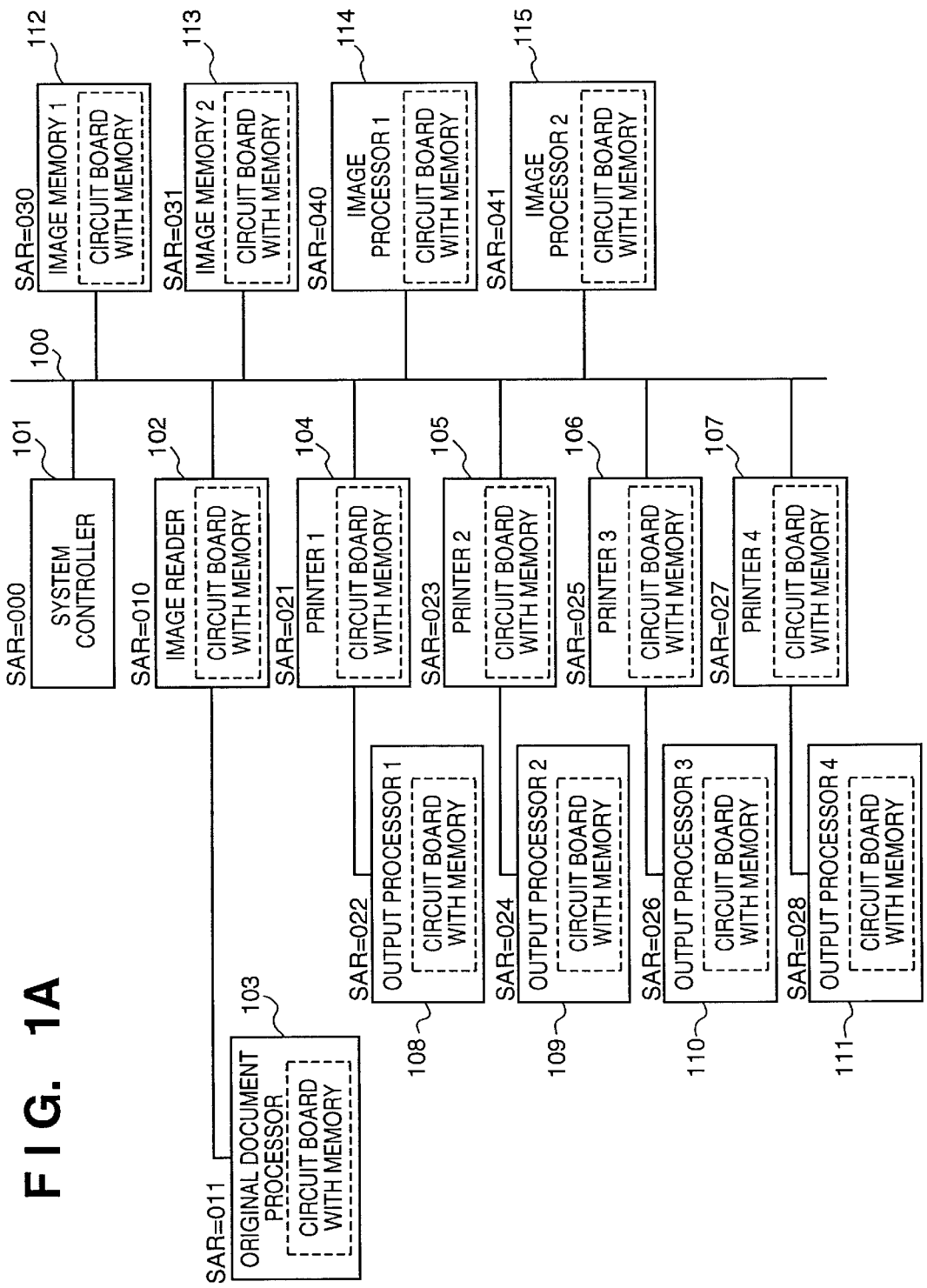
FIG. 1A is a block diagram showing the construction of an image forming system according to a preferred embodiment of the present invention.

FIG. 1A is a block diagram showing the construction of an image forming system (hereinafter simply referred to as "system") as a typical embodiment of the present invention. As shown in FIG. 1A, the system comprises a system controller 101, an image reader 102, an original document processor 103, image memories 1 and 2 (112 and 113), image processors 1 and 2 (114 and 115), printers 1 to 4 (104 to 107), and output processors 1 to 4 (108 to 111), respectively connected to a network 100. The network 100 is typically an Ethernet LAN which allows the respective devices to communicate with each other in accordance with a CSMA/CD protocol. Accordingly, each of the devices connected to the network 100 has a circuit board where a CPU to control the device itself, a memory, and a communication unit for communication with the system controller 101 and other devices via the network 100 are integrated.

Further, each of the devices connected to the network 100 has an address (hereinafter referred to as "system address ("SAR" in FIG. 1A)") uniquely assigned in the system. The system controller 101 identifies each device in accordance with the value of its system address. In FIG. 1A, three-digit numbers assigned to the respective devices are the address values.

Figure 1B:
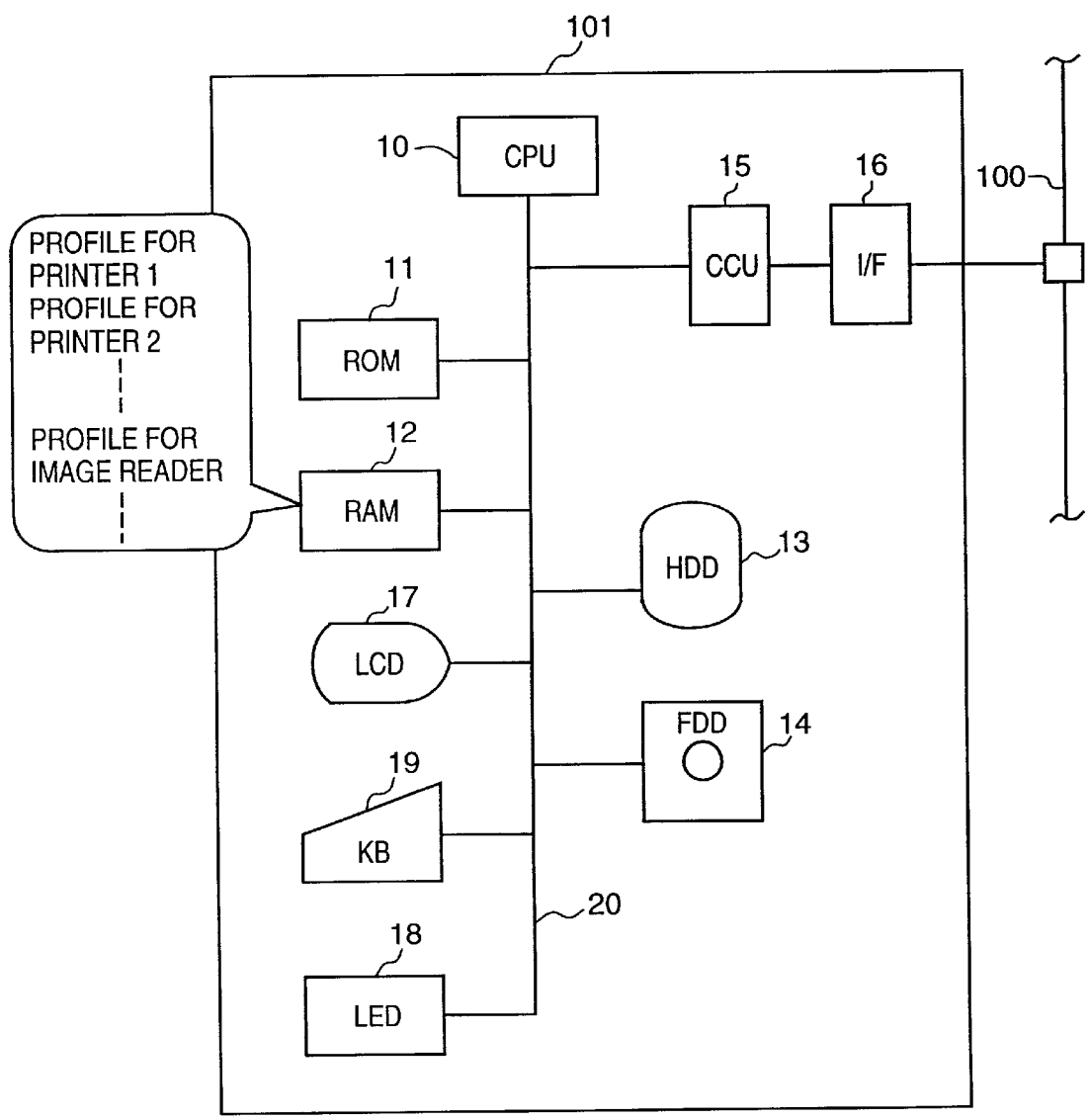
FIG. 1B is a block diagram showing in detail the construction of a system controller.

FIG. 1B is a block diagram showing in detail the construction of the system controller 101 that controls the overall system.

As shown in FIG. 1B, the system controller 101 comprises a central processing unit (CPU) 10 which controls the system and the system controller 101 itself, a ROM 11 in which various control programs executed by the CPU 10 are stored, a RAM 12 used as a work area for the CPU 10 to perform various processings, a hard disk (HD) 13 in which programs non-resident in the ROM 11 and data are stored, a floppy disk drive (FDD) 14 which inputs data from a floppy disk containing, e.g., driver programs for various devices connected to the system.

Further, the system controller 101 comprises a communication control unit (CCU) 15 which performs communication with other devices connected to the system via the network 100, and an interface (I/F) unit 16 for communication with the network 100.

Further, the system controller 101 comprises, as man-machine interface for a user of the system, an LCD display 17 which displays various information, an LED lamp 18 which displays operation status of the system and/or the system controller 101, and a keyboard (KB) 19 for performing various instructions to the system and/or the system controller 101. The LCD display 17, the LED lamp 18 and the keyboard 19 constitute an operation unit. The elements described above are interconnected with each other via a CPU bus 20.

When the power of the system controller 101 is turned on, the system controller 101 performs communication with the respective devices in accordance with a predetermined protocol, collects profiles of the respective devices, to be described later, from the respective devices, stores the collected information into a predetermined area of the RAM 12, and utilizes the information in processing to be described later.

The hard disk (HD) 13 contains information defining various specifications of devices connected or connectable to the system for so-called Plug And Play function. Accordingly, even if a new device is installed into the system, as long as the information on the device is stored in the hard disk (HD) 13, the CPU 10 reads the information and identifies the device, and implements the device as an operative device in the system. Further, even if the information on the new device is not stored in the hard disk (HD) 13, the new device can be implemented in the system by reading information on the device from a floppy disk inserted into the floppy disk drive (FDD) 14.

The system starts predetermined processing when operation is designated from the operation unit of the system controller 101. An original document processed by the original document processor 103 is forwarded to the image reader 102, and image information read by the image reader 102 is sent to the image memory 1 (112) or the image memory 2 (113) and stored in the memory. Note that the original document processor 103 performs automatic paper-feed processing to feed a plurality of original image sheets stacked on a tray into the image reader 102 one by one, turn-over processing to turn over an original image sheet printed on both sides, and the like.

The image information stored in the image memory 112 or 113 is forwarded to the image processor 114 or 115 and processed by the processor, and forwarded to any one of the printers 104 to 107. The printer (one of the printers 104 to 107) prints an image on a print medium such as a print sheet, based on the received image information, and the output processors 108 to 111 perform further processing on the print medium. The processing includes stapling processing to staple a plurality of output print media together, bookbinding processing and the like.

As described above, the system, comprising a plurality of devices having various functions, performs image forming processing by combining these devices functionally and dynamically. Accordingly, the respective devices constituting the system can be regarded as functional units. Therefore, when the functions of the respective devices are explained, the respective devices will be simply referred to as functional units.

Figure 2:
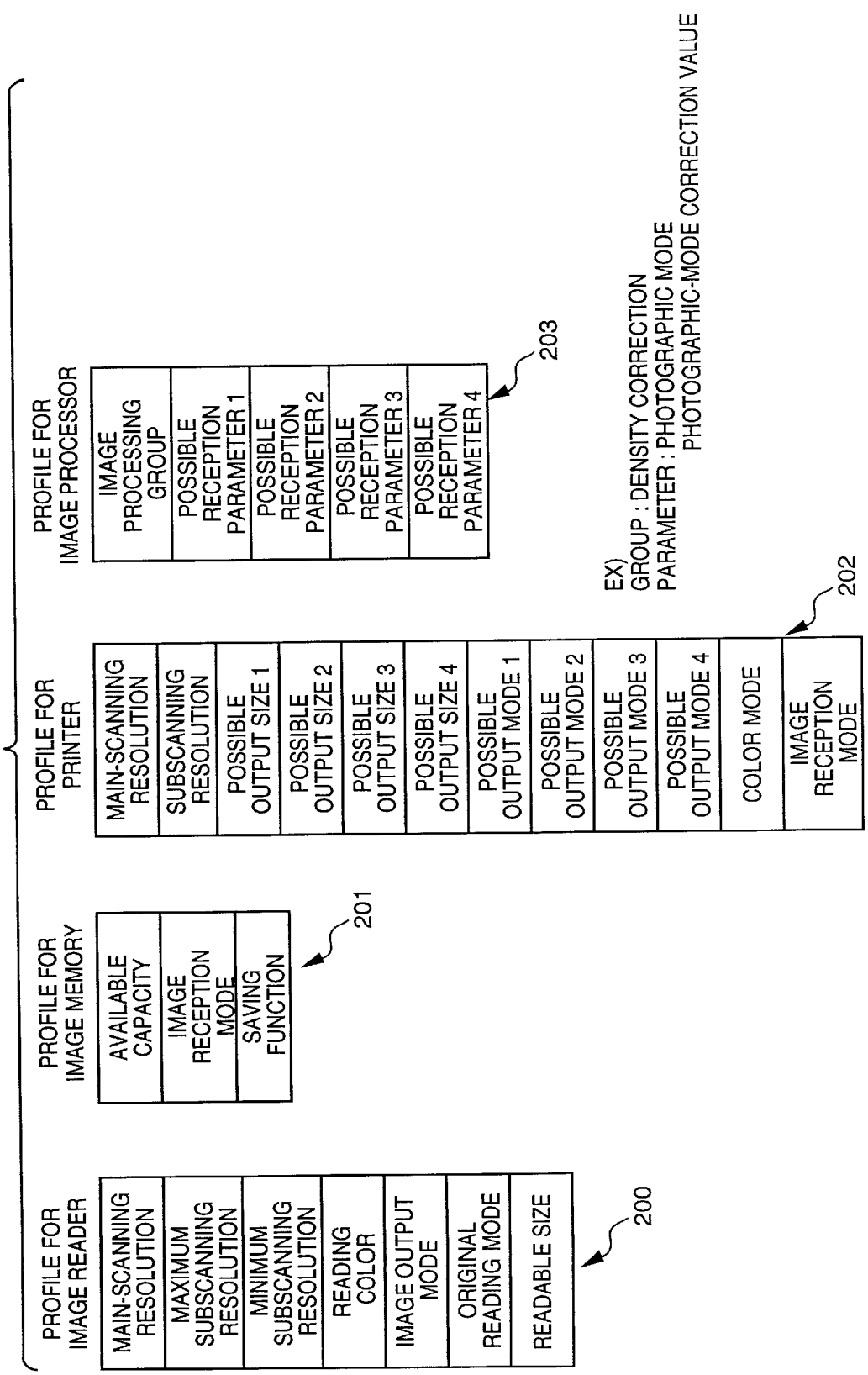
FIG. 2 shows structures of profiles according to the embodiment.

FIG. 2 shows lists of the functions of the respective devices connected to the network 100 as shown in FIG. 1A. Note that hereinafter each list will be referred to as "profile".

In FIG. 2, reference numeral 200 denotes a profile for the image reader 102; 201, a profile for the image memories 112 and 113; 202, a profile for the printers 104 to 107; and 203, a profile for the image processors 114 and 115. In each device, the profile is stored in the memory on the circuit board. When the power of the system controller 101 is turned on, the profiles are uploaded from the memories of the devices to the system controller 101 via the network 100, and stored in the RAM 12.

First, the profile 200 for the image reader 102 will be described in detail.

In the profile 200 for the image reader 102 as shown in FIG. 2, "main-scanning resolution" indicates a resolution of image reading by the image reader 102. Generally, the value of the main-scanning resolution is defined by the number of dots per inch (e.g., "400 dpi" or "600 dpi"), and the profile "main-scanning resolution" is set to a possible output resolution of the image reader 102. Further, "subscanning resolution" is defined by a maximum value and a minimum value as follows. That is, an image reader, which irradiates light on an original document, inputs reflected light from the original document into a photoelectric transducer and obtains an image signal, moves an irradiation light source in a sub-scanning direction. The density of the image signal to be inputted into the photoelectric transducer, i.e., the resolution can be changed by varying the moving speed of a scanner integrating the photoelectric transducer. Accordingly, the maximum and minimum values of the subscanning resolution are used as profile.

Further, "reading color" is a type of color readable by the above-described scanner. A general image reader performs full color (RGB) reading, monochrome (black and white) reading and the like. That is, the "reading color" indicates any one of the types of reading that the image reader 102 can perform. Further, "image output mode" indicates the way of outputting the read image data. For example, in case of full-color reading, image output can be made by simultaneously outputting three color components by one scanning operation, or sequentially outputting three color components by three scanning operations.

Further, "original reading mode" indicates the way of processing performed by the original document processor 103 on an original document. For example, image reading from double-sided original document or from single-sided original document, or image reading sequentially performed by half a page from an A3 sized original document, or the like, is set. "Readable size" indicates the size of original document on which the image reader 102 can perform image reading.

Next, the profile 201 for the image memories 112 and 113 will be described in detail.

In the profile 201 for the image memories 112 and 113, "available capacity" indicates a residual capacity available for storing image data in the image memories 112 and 113. Further, "image reception mode" indicates an image output mode in which the image memories can receive image data. As described above, in a specific image output mode of the image reader 102, image data cannot be stored into an image memory. For example, if the image reader 102 simultaneously outputs image data for three colors (RGB), the data cannot be stored into the memory without parallel data reception facility. Accordingly, the "image reception mode" indicates whether or not image data can be stored in such output mode. "Saving function" indicates whether or not there is a function to save image data after the image data has been outputted. In some memories, a memory device merely comprises a DRAM. If the power of the memory is turned off, all the stored image data are lost. Since there is a possibility that a memory has a construction inappropriate to permanent storage of image data, this saving function is clearly indicated.

In FIG. 2, the profile 202 for the printers 104 to 107 has information on the output processors 108 to 111 as well as information on the printers 104 to 107. In this profile, "main-scanning resolution" and "subscanning resolution" indicate respective main-scanning and subscanning resolutions of an output image from the printer. Further, "possible output size (n, where n=1–4)" indicates paper sizes appropriate to the printer. "Possible output mode (m, where m=1–4)" indicates possible output formats, realized by optional units such as double-sided printing unit or sorter, which includes "double-sided output mode", "sorting mode", "staple mode" and the like. Further, "color mode" indicates information on colors which the printer can handle, including information "monochrome (black and white)", "color", "binary", "multivalue" and the like. "Image reception mode" indicates image interface of the printer for receiving image data. For example, a laser-beam color printer having one electrostatic drum receives four-color image data (YMCK) four times, while a laser-beam color printer having four electrostatic drums simultaneously receives the respective four-color image data at independent timings. Such difference between these printers is described in the profile.

In the profile 203 for the image processors 114 and 115 in FIG. 2, "image processing group" indicates possible image processing of the processor such as "filtering" and "γ-table processing". Further, "possible reception parameter" indicates a parameter which can be used for setting the profile, among input parameters from the operation unit of the system controller 101, or the type of data table stored in the image processor.

For example, in a case where the above "filtering" is specified in the "image processing group", the " possible reception parameter" corresponds to a parameter set by the user such as the value of original-document type (character/photograph/map), a sharpness control value and the like. In a case where the "γ-table processing" is specified in the "image processing group", the " possible reception parameter" corresponds to a parameter set by the user such as the value of density correction, color-balance control value and the like, and/or the type of a data table for γ-conversion having a nonlinear characteristic, included in the image processor.

Next, in the system having the above construction, a procedure of collecting profiles from the respective devices connected to the network 100 when the power of the system controller 101 is turned on will be described.

Figure 3:
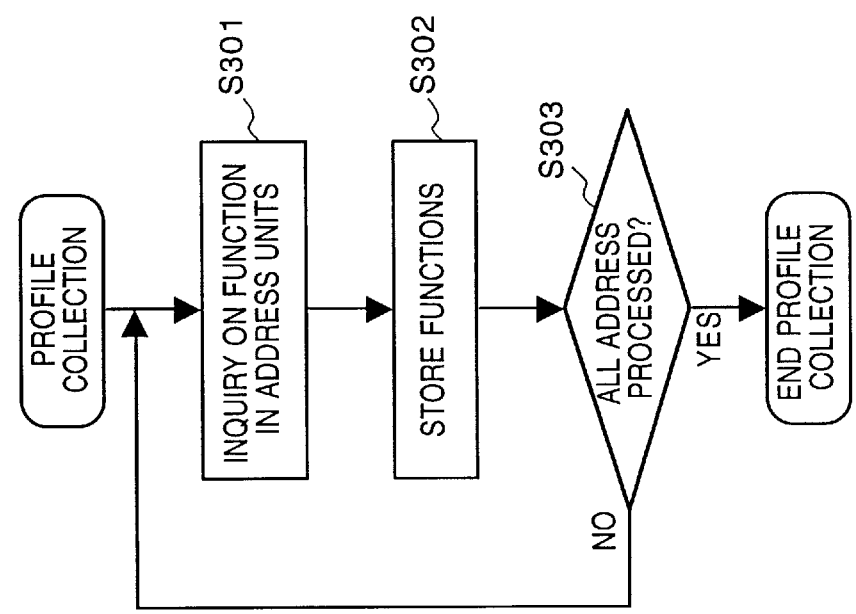
FIG. 3 is a flowchart showing a profile collection algorithm.

FIG. 3 is a flowchart (collection flow) showing processing to collect static information (hereinafter referred to as "static profile") which is a part of the profile and which is fixed regardless of the operation status of the device. The static profiles are collected by utilizing the system addresses, uniquely assigned to the respective devices 101 to 111 connected to the network 100 in FIG. 1.

First, when the power of the system controller 101 is turned on, inquiries are made on the functions of the respective devices at step S301. That is, each device is inquired on its function by using its system address. In response to the inquiry, the device sends its profile stored in the memory of the circuit board via the network 100 to the system controller 101. At step S302, the profile obtained at step S301 is stored into the RAM 12 of the system controller 101.

At step S303, it is determined whether or not the profiles have been obtained from all the communicable system addresses, i.e., whether or not inquires have been made with respect to all the devices which have been turned on and enabled. If NO, the process returns to step S301, at which inquiry is made with respect to a device indicated by the next system address. On the other hand, if YES at step S303, i.e., inquires with respect to all the communicable system addresses have been completed, the process ends.

Note that with respect to a device in which the power has been turned on after the power of the system controller 101 was turned on, the above profile collection processing is performed at the point where the device has become operative. Further, when a new device is added to the system, information corresponding to the device is read from the hard disk (HD) 13 or a floppy disk by utilizing the Plug And Play function. The device is identified by the information, and implemented in the system. Thereafter, the above profile collection is performed on the device. In this case, a device in which the power has been newly turned on or a newly-added device issues a request to the system controller 101 to update the static information. Then the system controller 101 performs the above profile collection and updates the static information.

This request may be automatically performed when the power of the device is turned on or when a predetermined switch provided on the operation board of the respective devices is depressed. Normally, in a device already implemented in the system, the request is made when the power of the device is turned on, while in a device newly added to the system, the request is made when a predetermined switch on the operation board of the device is manually depressed at a point where implementation procedure has been completed. When an update request is issued from any device, the system controller 101 detects the update request and starts the above collection processing.

Next, a procedure of utilizing profiles collected by the system controller 101 will be described with reference to the flowcharts of FIG. 4A to 4D.

Figure 4A:
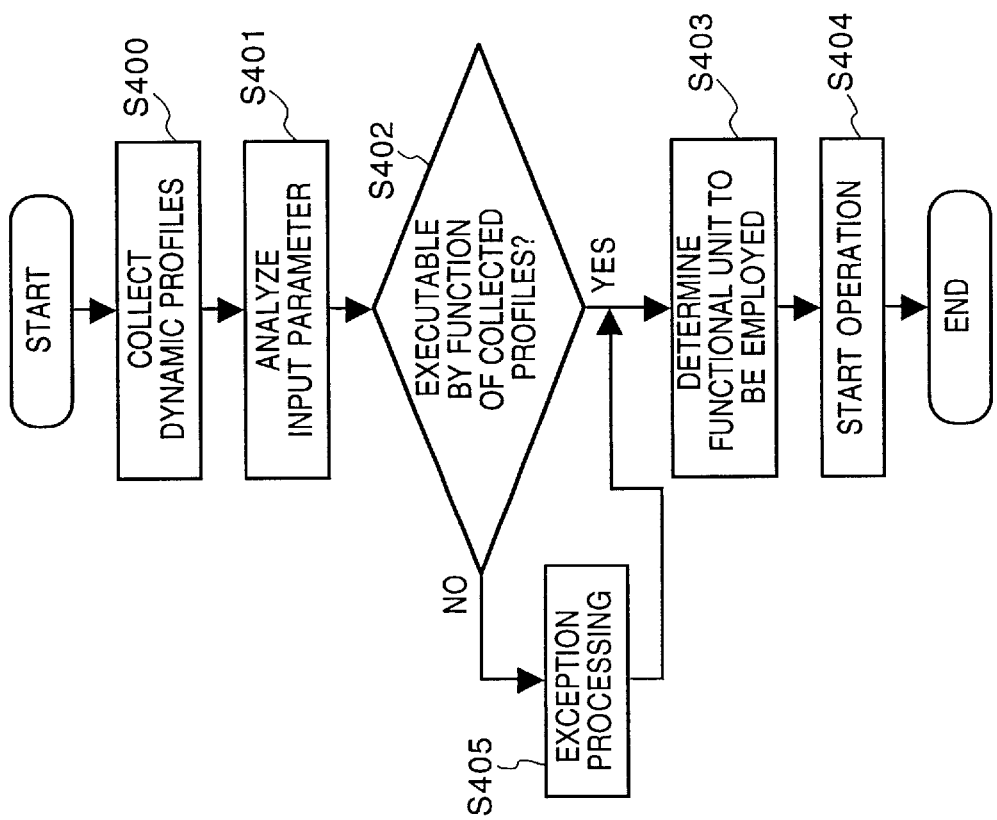
FIG. 4A is a flowchart showing a procedure of utilizing the profiles in copying processing in the image forming system according to the embodiment.

FIG. 4A shows a procedure of utilizing the profile in copying processing in the image forming system.

First, at step S400, at the point where a user's instruction is entered, profile collection is performed again with respect to the functional units connected to the system because the contents of the profile include information which dynamically varies in accordance with operation condition of device. This is dynamic profile collection. For example, the current available capacity of the image memories 112 and 113 can be obtained by this dynamic profile collection. Further, it can be reconfirmed whether or not the functional units connected to the system when the system was started are still available.

Next, at step S401, a parameter included in a input string from the operation unit connected to the system controller 101 is analyzed, and the input string is divided into parameters for the respective functional units. For example, the user's instruction "to perform control density on an A3 sized double-sided color original document having photographs to slightly raise brightness, without zooming (magnification and reduction), and to output images in full color on both sides of an A3 sized print sheet" is divided into parameters "A3 original document", "photographic mode", "color original-document reading", "RDF", "main-scanning zooming: 100%", "subscanning zooming: 100%", "density control value", "full-color output" and "A3 double-sided output". Then, the corresponding profiles of the devices are respectively identified as acceptable to t he separated parameter values.

Figure 4B:
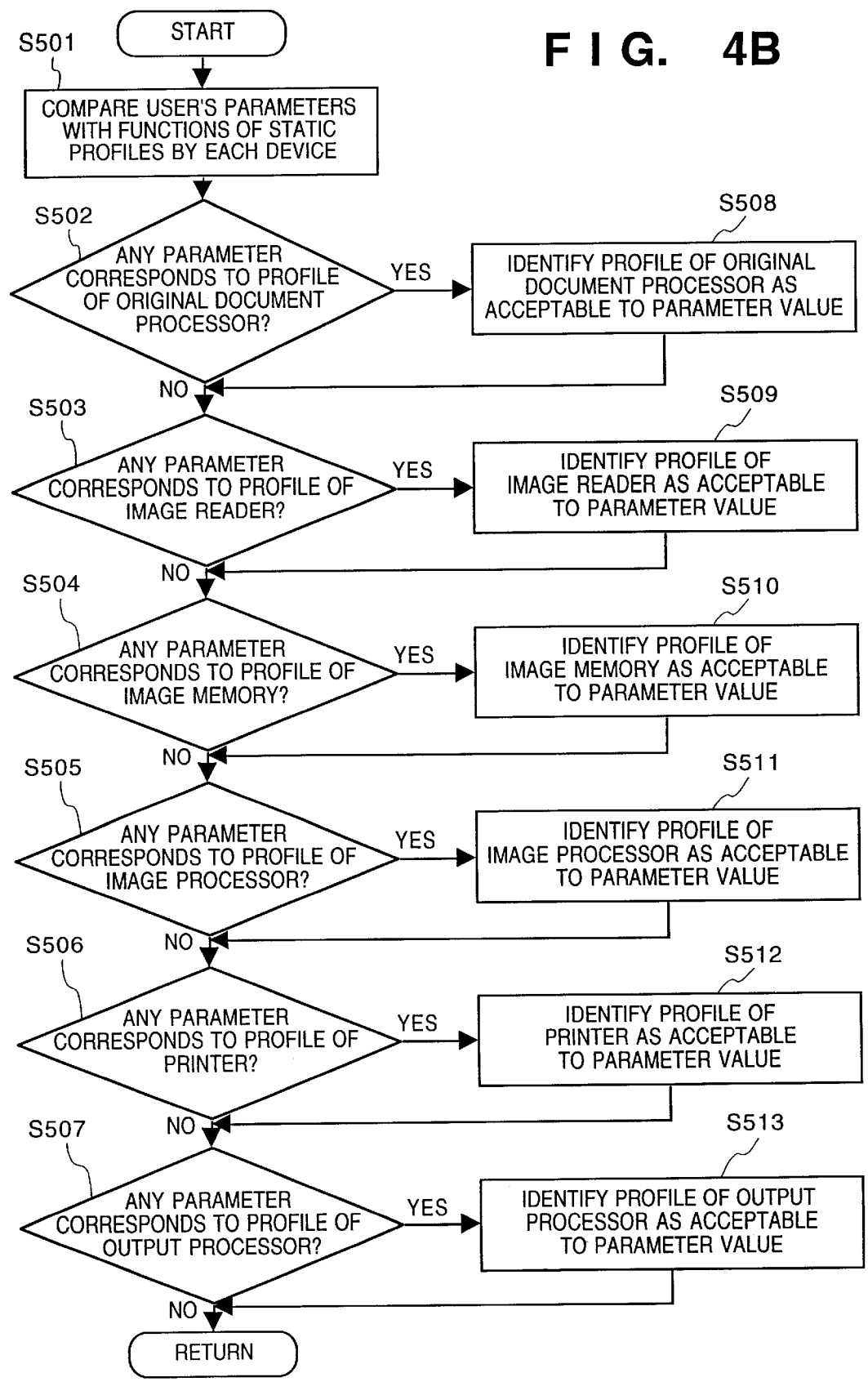
FIG. 4B is a flowchart showing in detail input-string analysis processing at step S401.

This processing will be described in detail with reference to FIG. 4B.

First, at step S501, the input string is analyzed and separated in correspondence with the respective functional units, as described above. Then, the separated parameters are compared with the functions of the respective devices described in the respective static profiles obtained and stored in the RAM 12 at step S301. At step S502, it is examined whether or not there is any parameter which is used to set the profile of the original document processor 103. If there is a parameter corresponding to the profile of the original document processor 103, the process proceeds to step S508, at which the corresponding profile is identified as acceptable to the parameter value. Then the process proceeds to step S503. If there is no parameter corresponding to the profile of the original document processor 103, the process proceeds to step S503.

At step S503, it is examined whether or not there is any parameter which is used to set the profile of the image reader 102. If there is a parameter corresponding to the profile of the image reader 102, the process proceeds to step S509, at which the corresponding profile is identified as acceptable to the parameter value. Then the process proceeds to step S504. If there is no parameter corresponding to the profile of the image reader 102, the process proceeds to step S504.

At step S504, it is examined whether or not there is any parameter which is used to set the profile of the image memories 112 and 113. If there is a parameter corresponding to the profile of the image memories 112 and 113, the process proceeds to step S510, at which the corresponding profile is identified as acceptable to the parameter value. Then the process proceeds to step S505. If there is no parameter corresponding to the profile of the image memories 112 and 113, the process proceeds to step S505.

At step S505, it is examined whether or not there is any parameter which is used to set the profile of the image processors 114 and 115. If there is a parameter corresponding to the profile of the image processors 114 and 115, the process proceeds to step S511, at which the corresponding profile is identified as acceptable to the parameter value. Then the process proceeds to step S506. If there is no parameter corresponding to the profile of the image processors 114 and 115, the process proceeds to step S506.

At step S506, it is examined whether or not there is any parameter which is used to set the profile of the printers 104 to 107. If there is a parameter corresponding to the profile of the printers 104 to 107, the process proceeds to step S512, at which the corresponding profile is identified as acceptable to the parameter value. Then the process proceeds to step 507. If there is no parameter corresponding to the profile of the printers 104 to 107, the process proceeds to step S507.

At step S507, it is examined whether or not there is any parameter which is used to set the profile of the output processors 108 to 111. If there is a parameter corresponding to the profile of the output processors 108 to 111, the process proceeds to step S513, at which the corresponding profile is identified as acceptable to the parameter value. Then the process ends. If there is no parameter corresponding to the profile of the output processors 108 to 111, the process ends.

In the above processing, if a parameter "subscanning zooming: 100%" is obtained from the analysis of the input setting parameter, it is examined at the respective above steps whether or not the static profile of each device (functional unit) has a subscanning zooming function. If the image reader 102 has a reading speed change function, the above parameter setting is possible. In this case, the corresponding profile of the image reader 102 is identified as acceptable to the parameter value.

Returning to FIG. 4A, at step S402, it is determined whether or not functions of the collected profiles can be realized based on the result of processing at step S401 right away. In this case, the respective profiles are retrieved with the respective parameters: "A3 original document" corresponds to the profile for the image reader 102 and the image memories 112 and 113; "photographic mode" corresponds to the profile for the filtering functional unit in the image processor 114 and the profile for the γ-table processing unit of the image processor 115; "color original-document reading" "RDF", "main-scanning zooming: 100%", "subscanning zooming: 100%" correspond to the profiles for the image reader 102 and the printers 104 to 107; "density control value" corresponds to the profile for the γ-table processing unit of the image processor 115; and "full color output" and "A3 double-sided output" correspond to the profile for the printers 104 to 107. Then, it is determined whether or not the execution based on the above setting in the respective functional units is possible right away.

Note that if it is detected from the collection of the dynamic profiles that a desired functional unit is temporarily unavailable due to some reason, e.g., it is working for another purpose and there is no alternate, but there is a possibility that the status of the functional unit will change (e.g., it completes the current operation) and become available, the fact is notified to the user by displaying a message on the LCD display 17 of the operation unit of the system controller 101. Then any progress of the process is waited.

Note that, in this case, the functional unit which is now unavailable will notify the system controller 101 of an available status via the network 100 when it will become available again.

However, if it is determined at step S402 that the desired function cannot be performed even though the process awaits, the process proceeds to step S405, at which exception processing is performed. Note that, in this case, the functional unit which is now unavailable notifies the system controller 101 of the fact that a certain facility such as a double-sided printing unit is malfunctioned, and this malfunction will not be recovered unless it is fixed by a maintenance engineer.

Figure 4C:
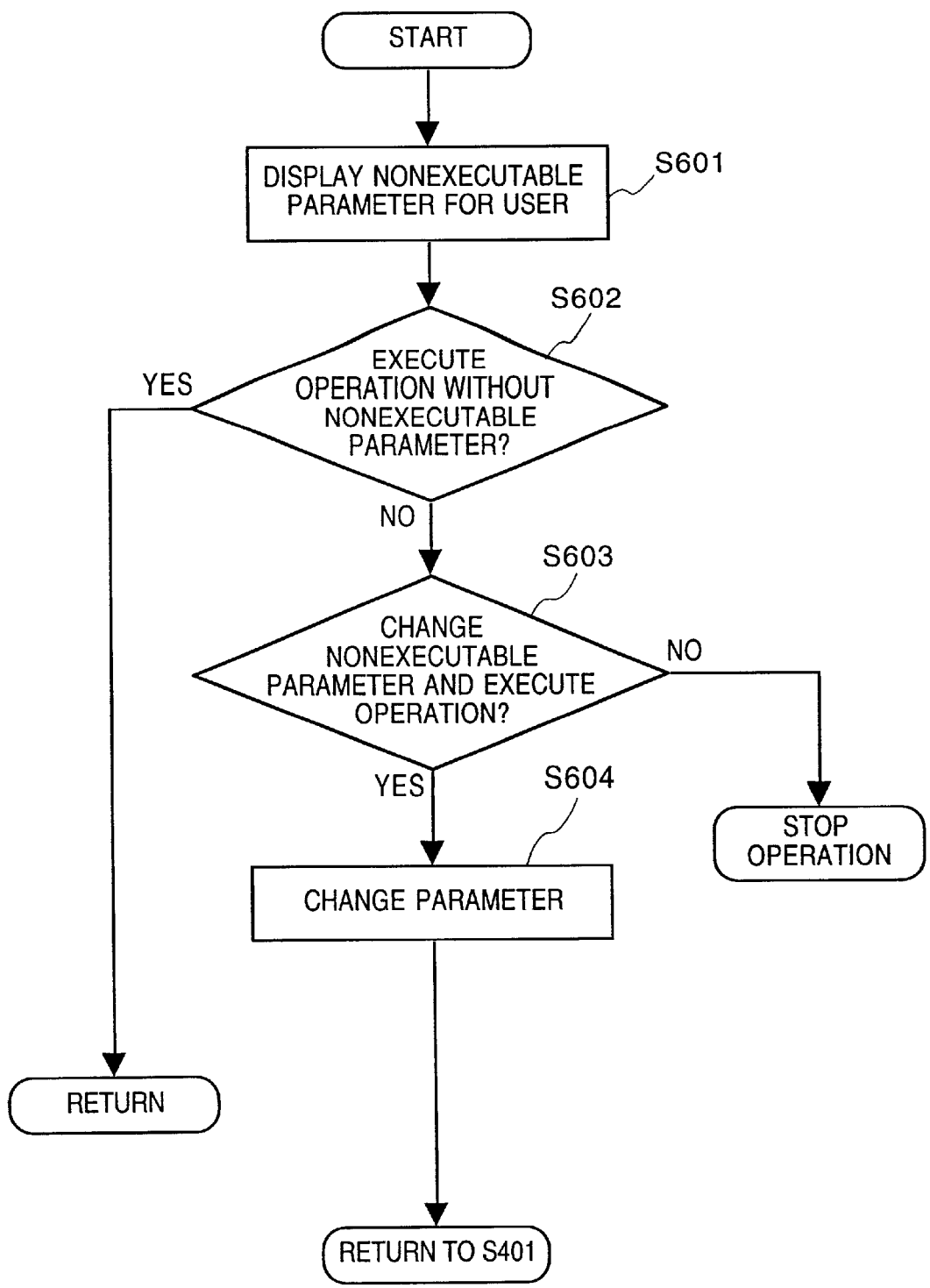
FIG. 4C is a flowchart showing in detail exception processing at step S405.

The exception processing will be described in detail with reference to FIG. 4C.

First, at step S601, the copying processing is temporarily halted, and the halt of the copying is notified to the user by displaying a message on the LCD display 17 of the operation unit of the system controller 101. Further, nonexecutable parameter(s) is displayed on the LCD display 17.

Next, at step S602, a message asking whether or not only the nonexecutable parameter(s) can be deleted to continue the copying processing is displayed on the LCD display 17. If the user instructs from the keyboard 19 to delete the parameters) and continue the copying processing, the exceptional processing ends and returns to step S403.

With regard to the above user's input string "to perform control density on an A3 sized double-sided color original document having photographs to raise brightness, without zooming, and to output images in full color on both sides of an A3 sized print sheet", in a case where none of the printers 104 to 107 can be used for executing the printing in accordance with the above setting due to fault of a double-sided printing unit, paper jam or the like, if the user determines to abandon double-sided printing and to perform single-sided printing, the user makes the above operation.

On the other hand, if the user instructs from the keyboard 19 not to delete the nonexecutable parameter(s) to continue the copying processing, the process proceeds to step S603, at which a message asking whether or not the input parameters should be changed is displayed on the LCD display 17 for the user.

If the user instructs to change the parameter(s), the process proceeds to step S604, at which the user inputs desired parameter(s) or string. Thereafter, the process returns from the exceptional processing to step S401, at which the input parameter(s) or string is analyzed again. On the other hand, if the user instructs not to change the parameter(s), it is determined that the user has halted the execution of the copying processing, then the copying processing is stopped.

Returning to FIG. 4A again, if it is determined at step S402 that the desired function becomes executable, the process proceeds to step S403. At step S403, functional units corresponding to the respective functions are selected and determined by each function so as to actually perform the designated operation.

Figure 4D:
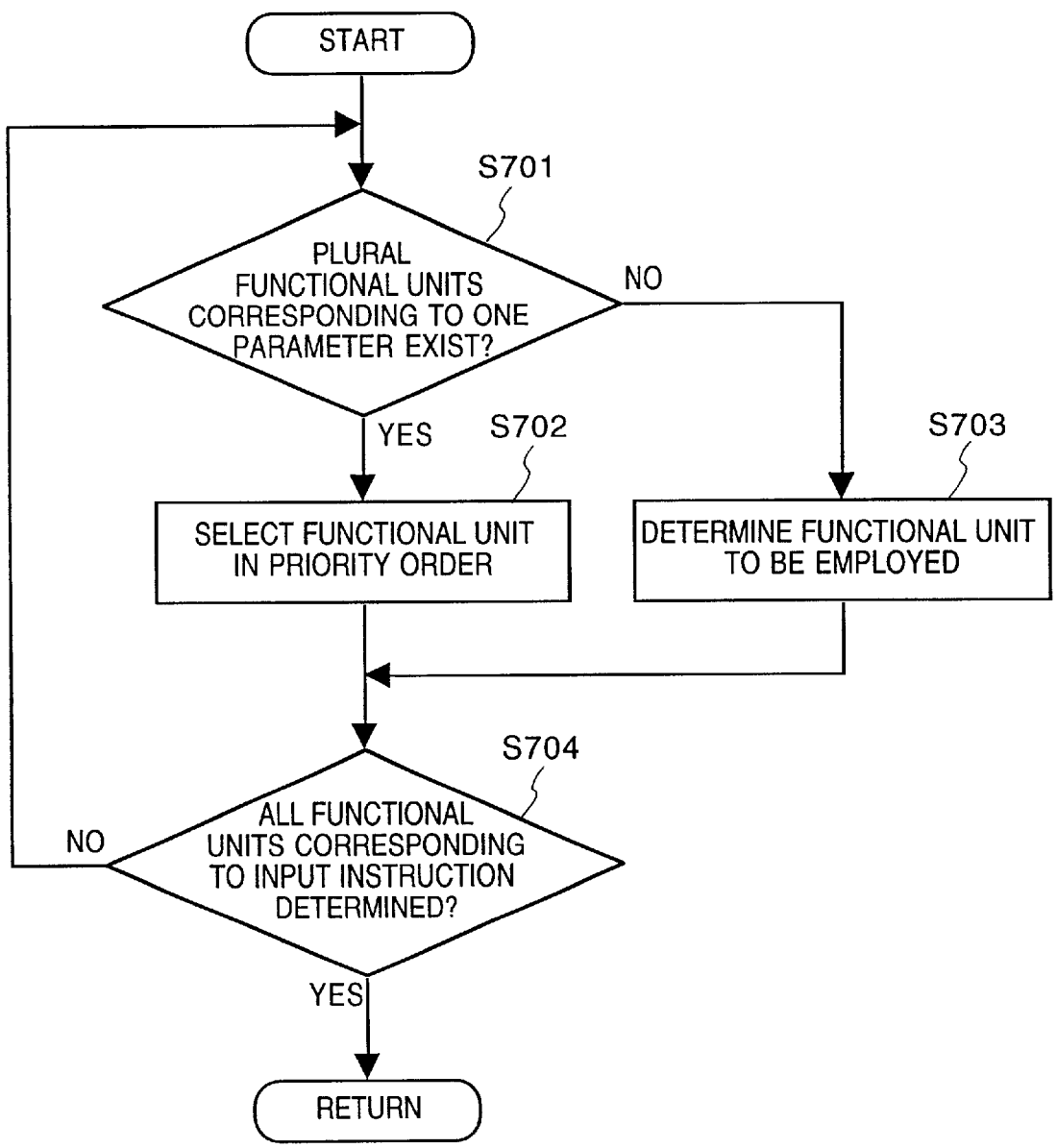
FIG. 4D is a flowchart showing in detail the processing at step S403.

This processing will be described in detail with reference to the flowchart of FIG. 4D.

At step S701, the number of functional units capable of performing a specific function is examined. For example, in the construction in FIG. 1A having four printers, there is a possibility that a plurality of printers are capable of performing a specific function. If it is determined that there are a plurality of functional units capable of performing the specific function, the process proceeds to step S702, at which a functional unit to execute the function is determined in accordance with a predetermined priority order. Then the process proceeds to step S704.

The predetermined priority order is the order based on printing-speed or print running-cost, for example. Such priority order is set in advance as system operation environment, by using the operation unit, in an NVRAM or the like as a part of the RAM 12 of the system controller 101.

At step S701, if there is one functional unit corresponding to the specific function, the process proceeds to step S703, at which the functional unit is determined as a functional unit that performs function designated by the user. Then, the process proceeds to step S704.

At step S704, it is examined whether or not all the functional units have been determined in correspondence with the parameters analyzed and specified from the user's input string. If NO, the process returns to step S701, while if YES, the process ends.

With regard to the above user's setting, the image reader 102, a printer capable of A3 full-color double-sided output (in this case, the printer 104 satisfies the condition), the image processor 114 having the filtering function, and the image processor 115 having the $\gamma$-table processing function are selected, and the respective setting parameters are transferred to the selected functional units, and are set to the corresponding portion of the respective functional units. Further, if the resolution handled by the selected image reader 102 and that handled by the printer 104 are both 400 dpi, an image memory having a capacity for storing image data corresponding to an A3 sized image of 400 dpi (in this case, the image memory 112 satisfies the condition) is selected.

When the above processing has been completed, the process proceeds to step S404 at which copying as the operation of the system is performed.

According to the embodiment as described above, when the power of the system controller is turned on, information indicating the respective functions of the plurality of devices connected via the network are collected as profiles. Upon image formation, the system control performs communication with the respective devices to determine whether or not functions necessary for realizing the instructed processing can be performed, in accordance with an instruction from the user, confirms and/or checks available functions, and automatically combines the available functions. Thus, the user can freely utilize a number of functions by combining the functions of the devices connected to the network without considering these functions.

It may be arranged such that, when the system controller combines functions based on the collected static and dynamic profiles to perform operation designated by the user, if a functional unit relating to the dynamic profile satisfies the condition of the operation but another functional unit relating to the static profile does not satisfy the condition of the operation, predetermined warning is made by using the LCD display or the LED lamp of the operation unit.

The object of the present invention can be also achieved by providing a storage medium storing program codes for performing the aforesaid processes to a system or an apparatus, reading the program codes with a computer (e.g., CPU, MPU) of the system or apparatus from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

As many apparently widely different embodiments of the present invention can be made without departing from the spirit and scope thereof, it is to be understood that the invention is not limited to the specific embodiments thereof except as defined in the appended claims.

What is claimed is:

1. An image forming system which has a plurality of separate functional units, each separate functional unit being directly connected via a network and in which the plurality of functional units communicate with each other via the network, comprising:

collection means for collecting information from each of the functional units, the information indicating functions which can be provided by each of the functional units connected via the network;

memory means for storing the information collected by said collection means;

analyzing means for analyzing an image forming processing to be performed which is selected by a user, and determining a plurality of functions which are necessary to perform the image forming processing in accordance with an analyzing result, wherein the plurality of functions are not capable of being performed by a single functional unit;

selecting means for selecting at least two of the functional units from the plurality of functional units which, when utilized in combination, can perform the plurality of functions determined by said analyzing means, based on the information stored in said memory means; and combining means for combining the functional units selected by said selecting means so as to perform the image forming processing by performing the plurality of functions determined by said analyzing means, the plurality of functions being provided by the combined functional units connected via the network.

2. The system according to claim 1, further comprising transmission means for transmitting the information from each of the functional units, wherein said collection means collects the information transmitted from each of the functional units by said transmission means.

3. The system according to claim 1, wherein the information provided by each of the functional units includes dynamic information which changes depending on operational status of each of the functional units and static information which is fixed regardless of the operational status of each of the units.

4. The system according to claim 1, further comprising detection means for detecting a functional unit which has been newly added to the image forming system, wherein said collection means collects information indicating the function which can be provided by the newly added function unit if said detecting means performs detection.

5. The system according to claim 1, further comprising determining means for determining as to whether or not said selecting means selects the functional units which are necessary to perform the image forming processings.

6. The system according to claim 5, wherein when said determining means determines that said selecting means cannot select the functional units which are necessary to perform the image forming processing, the execution of the imaging forming processing is temporarily halted.

7. The system according to claim 5, wherein when said determining means determines that said selecting means cannot select the functional units which are necessary to perform the image forming processing, a predetermined warning is given.

8. The system according to claim 7, further comprising notification means for notifying the predetermined warning.

9. The system according to claim 1, wherein the information indicating the functions of the plurality of functional units are collected by said collection means in accordance with addresses uniquely assigned to the respective functional units.

10. The system according to claim 1, wherein each of the functional units consists of any one of an image reader which reads an original document image to output image data, an image processor which processes image data, an image memory which stores image data and a printer which prints an image on a recording sheet based on image data.

11. The system according to claim 1, further comprising setting means for setting parameters to the functional units selected by said selecting means so as to perform the functions determined by said analyzing means at the selected functional units.

12. The system according to claim 1, further comprising a user interface for a user to instruct a desired image forming processing.

13. The system according to claim 12, wherein said user interface includes a display which displays various messages for the user, a keyboard for the user to input various instructions, and a lamp which is used to notify the user of operation status of said system.

14. The system according to claim 1, wherein when the plurality of functional units can perform one of identical functions determined by said analyzing means, said selecting means selects one of the plurality of the functional units in accordance with a predetermined priority order.

15. A control method for an image forming system which has a plurality of separate functional units, each separate functional unit being directly connected via a network, and in which the plurality of functional units communicate with each other via the network, comprising:

a collection step of collecting information from each of the functional units, the information indicating functions which can be provided by each of the functional units connected via the network;

a storing step of storing the information collected at said collection step into a storage medium;

an analyzing step of analyzing an image forming processing to be performed which is selected by a user, and determining a plurality of functions which are necessary to perform the image forming processing in accordance with an analyzing result, wherein the plurality of functions are not capable of being performed by a single functional unit;

a selecting step of selecting at least two of the functional units from the plurality of functional units which, when utilized in combination, can perform the plurality of functions determined at said analyzing step, based on the information stored in the storage medium; and a combining step of combining the functional units selected at said selecting step so as to perform the image forming processing by performing the plurality of functions determined in said analyzing step, the plurality of functions being provided by the combined functional units connected via the network.

16. The method according to claim 15, further comprising a transmitting step of transmitting the information from each of the functional units, wherein the transmitted information is collected at said collecting step.

17. The method according to claim 15, wherein the information provided by each of the functional units includes dynamic information which changes depending on operational status of each of the functional units and static information which is fixed regardless of the operational status of each of the functional units.

18. The method according to claim 15, further comprising a detecting step of detecting a functional unit which has been newly added to the image forming system, wherein information indicating a function which can be provided by the newly added functional unit is collected at said collecting step, if the detection is performed at said detecting step.

19. The method according to claim 15, further comprising a determining step of determining as to whether or not the functional units which are necessary to perform the image forming processing is selected at said selecting step.

20. The method according to claim 19, wherein when it is determined at said determining step that the functional units which are necessary to perform the image forming processing cannot be selected at said selecting step, the execution of the image forming processing is temporarily halted.

21. The method according to claim 19, wherein when it is determined at said determining step that the functional units which are necessary to perform the image forming processing cannot be selected at said selecting step, a predetermined warning is given.

22. The method according to claim 21, further comprising a notifying step of notifying the predetermined warning.

23. The method according to claim 15, wherein the information indicating the functions of the plurality of functional units are collected at said collecting step in accordance with addresses uniquely assigned to the respective functional units.

24. The method according to claim 15, wherein each of the functional units consists of any one of an image reader which reads an original document image to output image data, an image processor which processes image data, an image memory which stores data, and a printer which prints an image on a recording sheet based on image data.

25. The method according to claim 15, further comprising a setting step of setting parameters to the functional units selected at said selecting step so as to perform the functions determined at said analyzing step at the selected functional units.

26. The method according to claim 15, further comprising an instructing step of instructing a desired image forming processing.

27. The method according to claim 15, wherein when the plurality of functional units can perform one of identical functions determined at said analyzing step, one of the plurality of functional units is selected at said selecting step in accordance with a predetermined priority order.

28. A control apparatus in an image forming system which has a plurality of separate functional units, each separate functional unit being directly connected via a network, and in which the plurality of functional units communicate with each other via the network, comprising:

collection means for collecting information from each of the functional units, the information indicating functions which can be provided by each of the functional units connected via the network;

memory means for storing the information collected by said collection means;

analyzing means for analyzing an image forming processing to be performed which is selected by a user, and determining a plurality of functions which are necessary to perform the image forming processing in accordance with an analyzing result, wherein the plurality of functions are not capable of being performed by a single functional unit;

selecting means for selecting at least two of the functional units from the plurality of functional units which, when utilized in combination, can perform the plurality of functions determined by said analyzing means, based on the information stored in said memory means; and combining means for combining the functional units selected by said selecting means so as to perform the image forming processing by performing the plurality of functions determined by said analyzing means, the plurality of functions being provided by the combined functional units connected via the network.

29. The apparatus according to claim 28, wherein said collection means collects the information transmitted from each of the functional units via the network.

30. The apparatus according to claim 28, wherein the information provided by each of the functional units includes dynamic information which changes depending on operational status of each of the functional units and static information which is fixed regardless of the operational status of each of the functional units.

31. The apparatus according to claim 28, wherein said collection means collects information indicating a function which can be provided by a functional unit which has been newly added to the image forming system.

32. The apparatus according to claim 28, further comprising determining means for determining as to whether or not said selecting means selects the functional units which are necessary to perform the image forming processing.

33. The apparatus according to claim 32, wherein when said determining means determines that said selecting means cannot select the functional units which are necessary to perform the image forming processing, the execution of the image forming processing is temporarily halted.

34. The apparatus according to claim 32, wherein when said determining means determines that said selecting means cannot select the functional units which are necessary to perform the image forming processing, a predetermined warning is given.

35. The apparatus according to claim 28, wherein the information indicating the functions of the plurality of functional units are collected by said collection means in accordance with addresses uniquely assigned to the respective functional units.

36. The apparatus according to claim 28, wherein each of said functional units consists of any one of an image reader which reads an original document image to output image data, an image processing which processes image data, an image memory which stores image data, and a printer which prints an image on a recording sheet based on image data.

37. The apparatus according to claim 28, further comprising setting means for setting parameters to the functional units selected by said selecting means so as to perform the functions determined by said analyzing means at the selected functional units.

38. The apparatus according to claim 28, wherein when a plurality of functional units can perform one of identical functions determined by said analyzing means, said selecting means selects one of the plurality of functional units in accordance with a predetermined priority order.

* * * * *

UNITED STATES PATENT AND TRADEMARK OFFICE
CERTIFICATE OF CORRECTION

PATENT NO. : 6,236,464 B1
DATED : May 22, 2001
INVENTOR(S) : Hideto Kohtani et al.

It is certified that error appears in the above-identified patent and that said Letters Patent is hereby corrected as shown below:

Column 7,
Line 38, "t he" should read -- the --.

Column 9,
Line 30, "parameters)" should read -- parameter(s) --.

Column 12,
Line 16, "processings." should read -- processing. --.

Signed and Sealed this

Fifteenth Day of January, 2002

Attest:

Attesting Officer

JAMES E. ROGAN
Director of the United States Patent and Trademark Office